United States Patent
Park et al.

(10) Patent No.: US 9,874,637 B2
(45) Date of Patent: Jan. 23, 2018

(54) ILLUMINATION OPTICAL SYSTEM AND 3D IMAGE ACQUISITION APPARATUS INCLUDING THE SAME

(75) Inventors: Yong-hwa Park, Yongin-si (KR); Alexander Shirankov, Moscow (RU); Jang-woo You, Yongin-si (KR); Oleg Vladimirovich Rozhkov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 854 days.

(21) Appl. No.: 13/244,329

(22) Filed: Sep. 24, 2011

(65) Prior Publication Data

US 2012/0147147 A1 Jun. 14, 2012

(30) Foreign Application Priority Data

Dec. 14, 2010 (KR) ........................ 10-2010-0127866

(51) Int. Cl.
| | |
|---|---|
| *H04N 13/02* | (2006.01) |
| *G03B 15/06* | (2006.01) |
| *G03B 15/02* | (2006.01) |
| *G01S 17/89* | (2006.01) |
| *G01S 7/481* | (2006.01) |
| *H04N 5/225* | (2006.01) |

(52) U.S. Cl.
CPC ............ *G01S 17/89* (2013.01); *G01S 7/4814* (2013.01); *H04N 5/2256* (2013.01); *H04N 13/0253* (2013.01)

(58) Field of Classification Search
CPC .. H04N 13/0253; H04N 5/2256; G01S 17/89; G01S 7/4814

USPC .......................................................... 348/49
See application file for complete search history.

(56) References Cited

U.S. PATENT DOCUMENTS

| | | | |
|---|---|---|---|
| 5,850,300 A | 12/1998 | Kathman et al. | |
| 5,986,807 A | 11/1999 | Fork | |
| 6,091,905 A | 7/2000 | Yahav et al. | |

(Continued)

FOREIGN PATENT DOCUMENTS

| | | |
|---|---|---|
| JP | 62-150315 A | 7/1987 |
| JP | 6-11663 A | 1/1994 |

(Continued)

OTHER PUBLICATIONS

Hara, JP-2004-126203, Apr. 22, 2004, [0029] and drawings 1 and 8.*

(Continued)

*Primary Examiner* — Christopher S Kelley
*Assistant Examiner* — Matthew Kwan
(74) *Attorney, Agent, or Firm* — Sughrue Mion, PLLC

(57) ABSTRACT

An illumination optical system of a 3-dimensional (3D) image acquisition apparatus and a 3D image acquisition apparatus including the illumination optical system. The illumination optical system of a 3D image acquisition apparatus includes a beam shaping element which outputs light having a predetermined cross-sectional shape which is proportional to a field of view of the 3D image acquisition apparatus. The beam shaping element may adjust a shape of illumination light according to its cross-sectional shape. The beam shaping element may uniformly homogenize the illumination light without causing light scattering or absorption.

21 Claims, 6 Drawing Sheets

(56) References Cited

U.S. PATENT DOCUMENTS

| | | | |
|---|---|---|---|
| 6,100,517 | A | 8/2000 | Yahav et al. |
| 6,323,942 | B1 | 11/2001 | Bamji |
| 6,445,884 | B1 | 9/2002 | Yahav |
| 6,734,450 | B2 | 5/2004 | Kakiuchi et al. |
| 6,895,149 | B1 | 5/2005 | Jacob et al. |
| 7,016,519 | B1 | 3/2006 | Nakamura et al. |
| 7,060,957 | B2 | 6/2006 | Lange et al. |
| 7,095,487 | B2 | 8/2006 | Gonzalez-Banos et al. |
| 7,116,371 | B2 | 10/2006 | Kakiuchi et al. |
| 7,168,810 | B2 * | 1/2007 | Peterson et al. ............ 353/31 |
| 7,174,077 | B1 * | 2/2007 | Howard ............ G02B 6/262 362/551 |
| 7,206,132 | B2 | 4/2007 | Somani et al. |
| 7,390,097 | B2 | 6/2008 | Magarill |
| 2002/0186349 | A1 | 12/2002 | Wichner et al. |
| 2004/0120153 | A1 | 6/2004 | Pate |
| 2005/0035314 | A1 | 2/2005 | Yamaguchi |
| 2009/0147159 | A1 * | 6/2009 | Chen ................................ 349/8 |
| 2009/0284713 | A1 | 11/2009 | Silverstein et al. |
| 2010/0165307 | A1 * | 7/2010 | Mizushima et al. ............ 353/98 |
| 2011/0057930 | A1 * | 3/2011 | Keller et al. ................ 345/419 |

FOREIGN PATENT DOCUMENTS

| | | | |
|---|---|---|---|
| JP | 2002-62588 | A | 2/2002 |
| JP | 2003-43411 | A | 2/2003 |
| JP | 2004126203 | A * | 4/2004 |
| JP | 2004-170484 | A | 6/2004 |
| JP | 2004-341299 | A | 12/2004 |
| JP | 200733944 | A | 2/2007 |
| JP | 2009-122614 | A | 6/2009 |
| JP | 2009-300268 | A | 12/2009 |
| KR | 10-2003-0069109 | A | 8/2003 |
| KR | 10-2010-0025228 | A | 3/2010 |
| KR | 10-0972661 | B1 | 7/2010 |
| WO | 2010-068499 | A1 | 6/2010 |

OTHER PUBLICATIONS

Communication dated Feb. 18, 2013 issued by the European Patent Office in counterpart European Patent Application No. 11193384.2.

Schwarte, et al., "A New Fast, Precise and Flexible 3D-Camera Concept Using RF-Modulated and Incoherent Illumination", Proceedings International Conference for Sensorstranducers and Systems, Jan. 1, 1995, pp. 177-182, XP009013614.

Tai, et al., "Optimisation of the light transmission and irradiance distribution of an aspherical lens for 3-D time-of-flight sensors", Optics & Laser Technology, Mar. 1, 2000, vol. 32, No. 2, pp. 111-116, XP004213249.

Shafer, et al., "Gaussian to flat-top intensity distributing lens", Optics and Laser Technology, Jun. 1, 1982, vol. 14, No. 3, pp. 159-160, XP024516812.

Rhodes, et al., "Refractive optical systems for irradiance redistribution of collimated radiation: their design and analysis", Applied Optics, Oct. 15, 1980, vol. 19, No. 20, pp. 3545-3553, XP0009936847.

May, et al. "Three-Dimensional Mapping with Time-of-Flight Cameras", Journal of Field Robotics, 2009, vol. 26, No. 11-12, pp. 934-965, XP002691577.

Office Action dated Sep. 14, 2015, issued by the Japanese Patent Office in counterpart Japanese Patent Application No. 2011-272397.

Communication dated Nov. 30, 2016, issued by the Korean Intellectual Property Office in corresponding Korean Application No. 10-2010-0127866.

Communication dated May 25, 2016 issued by Korean Intellectual Property Office in counterpart Korean Application No. 10-2010-0127866.

Communication dated Jun. 9, 2016 issued by European Patent Office in counterpart European Patent Application No. 11 193 384.2.

Communication dated May 16, 2017, issued by the Korean Intellectual Property Office in counterpart Korean Application No. 10-2010-0127866.

* cited by examiner

ILLUMINATION OPTICAL SYSTEM AND 3D IMAGE ACQUISITION APPARATUS INCLUDING THE SAME

CROSS-REFERENCE TO RELATED APPLICATION

This application claims priority from Korean Patent Application No. 10-2010-0127866, filed on Dec. 14, 2010, in the Korean Intellectual Property Office, the disclosure of which is incorporated herein by reference.

BACKGROUND

Field

Apparatuses consistent with exemplary embodiments relate to illumination optical systems and three-dimensional (3D) image acquisition apparatuses including the same, and more particularly, to an optical system in which a field of illumination coincides with a field of view in order to obtain more precise depth information, and a 3D image acquisition apparatus including the optical system.

Description of the Related Art

Recent advances in 3D display apparatuses and an increasing demand therefore highlight the significance of 3D content in which depth can be perceived. Accordingly, research is increasing into 3D image acquisition apparatuses such as 3D cameras that enable users to create 3D content on their own. 3D cameras need to have a function through which both depth information and common 2D color image information are acquired through one photographing operation.

Depth information indicating distances between the 3D camera and surfaces of an object may be acquired using stereo vision methods that use two cameras, or using triangulation methods that use structured light and a camera. However, according to these methods, the greater the camera-to-object distance, the more imprecise the obtained depth information becomes, and these methods are highly dependent on the surface states of the objects being imaged. Thus, acquiring precise depth information with these methods is difficult.

To address these problems, Time-of-Flight (TOF) techniques have been introduced. TOF techniques measure a travel time of illumination light reflecting off an object after having been irradiated thereon to a light receiving unit for receiving the illumination light. TOF technology involves irradiating light having a specific wavelength (for example, near infrared rays having a wavelength of 850 nm) onto an object by using an illumination optical system that includes a light emitting diode (LED) or a laser diode (LD), receiving the light with a light receiving unit after the light is reflected off the object, and a series of process for extracting depth information, for example, by modulating the received light using a modulator with a known gain wavelength. Various TOF technologies for the series of processes are available.

In measuring distance using light reflected off an object after having been projected from an illumination optical system, the greater an amount of the reflected light that is incident on a 3D camera, the more precise the obtained depth information becomes. This is because in signal processing for extracting depth information using a 3D camera, a signal-to-noise ratio is proportional to an amount of incident light, and the greater the signal-to-noise ratio, the more precise obtained depth information becomes. However, in general, the field of view in a 3D camera does not match the field of illumination of its illumination optical system, and thus a considerable amount of illumination light may be lost and not used for extracting depth information. Therefore, an efficient optical system needs to be designed to provide a 3D camera with as much reflected light as possible.

In order for a 3D camera to obtain more precise depth information, a coherent light source having a short wavelength, such as an LD or an LED, may be used. However, when a coherent light source is used to emit light onto an object, speckle noise from the coherent light source may deteriorate the quality of the obtained image. To eliminate such speckle noise, a diffuser such as a frosted glass plate may be used. However, due to light scattering or absorption by the diffuser, depth information may be less precisely obtained.

SUMMARY

One or more exemplary embodiments provide an illumination system which is capable of obtaining more precise depth information in a 3-dimensional (3D) image acquisition apparatus.

One or more exemplary embodiments provide an illumination optical system able to efficiently inhibit speckle noise.

One or more exemplary embodiments provide a 3D image acquisition apparatus including the optical systems.

According to an aspect of an exemplary embodiment, an illumination optical system of a 3D image acquisition apparatus includes: a light source; a beam shaping element which uniformly homogenizes light emitted from the light source and emits light having a predetermined cross-sectional shape; and a lens apparatus which focuses light emitted from a light-exit surface of the beam shaping element.

In the illumination optical system, the predetermined cross-sectional shape of the light emitted from the beam shaping element may be the same as a cross-sectional shape of the beam shaping element, and may be proportional to a field of view of the 3D image acquisition apparatus.

The illumination optical system may further include a matching lens which is disposed between the light source and the beam shaping element and guides the light emitted from the light source to a light-incidence surface of the beam shaping element.

An anti-reflection coating may be disposed on each of a light-incident surface of the beam shaping element and a light exit surface of the beam shaping element.

A reflection coating may be disposed on an inner circumferential surface of the beam shaping element, and light incident on a light-incidence surface of the beam shaping element may travel through the beam shaping element toward the light light-exit surface while being reflected off the reflection coating disposed on the inner circumferential surface.

The beam shaping element may include an integrator rod made of a transparent material.

The integrator rod may have a rectangular cross-section.

The illumination optical system may further include an optical waveguide that guides the light emitted from the light source into the beam shaping device. A first end of the optical waveguide may be attached to the light source, and a second end of the optical waveguide may be attached to a side of the beam shaping element.

An optical axis of the optical waveguide may be inclined with respect to the side of the beam shaping element to enable the light guided into the beam shaping element to travel toward the light-exit surface of the beam shaping element.

The light source may include a plurality of light sources, the optical waveguide may include a plurality of optical waveguides, and each of the light sources may be attached to the beam shaping element via one of the optical waveguides.

The beam shaping element may have a rectangular cross-section, and at least one of the light sources and at least one of the optical waveguides may be disposed on each of four sides of the beam shaping element.

The illumination optical system may further include a plurality of matching lenses and the light source may include a plurality of light sources, wherein one of the plurality of matching lenses may is disposed on an optical path between the beam shaping device and each of the plurality of light sources.

At least one of the plurality of light sources and at least one of the plurality of matching lenses may have an optical axis which is tilted with respect to the light-incidence surface of the beam shaping element.

The beam shaping element may have a tapered shape such that an area of a light-exit surface of the beam shaping element is smaller than an area of a light-incidence surface of the beam shaping element.

In the illumination optical system, a plurality of beam shaping elements may be disposed to correspond to a plurality of light sources, and the illumination optical system may further include a plurality of matching lenses, wherein each of the matching lenses is disposed on an optical path between one of the plurality of light sources and a corresponding one of the plurality of beam shaping elements.

The plurality of beam shaping elements may be disposed in an array. In this regard, a width-to-height ratio of the array may be proportional to an aspect ratio of the field of view of the 3D image acquisition apparatus.

The lens apparatus may include a zoom lens.

According to another aspect of an exemplary embodiment, a 3D image acquisition apparatus includes: an objective lens which focuses an image of an object; an image processing unit which processes the image focused by the objective lens and generates an image signal; the illumination optical system described above that illuminates the object to acquire depth information about the object; and a control unit which controls operations of the objective lens, the image processing unit, and the illumination optical system.

BRIEF DESCRIPTION OF THE DRAWINGS

These and/or other aspects and advantages will become apparent and more readily appreciated from the following description of exemplary embodiments, taken in conjunction with the accompanying drawings of which.

DETAILED DESCRIPTION

Figure 1:
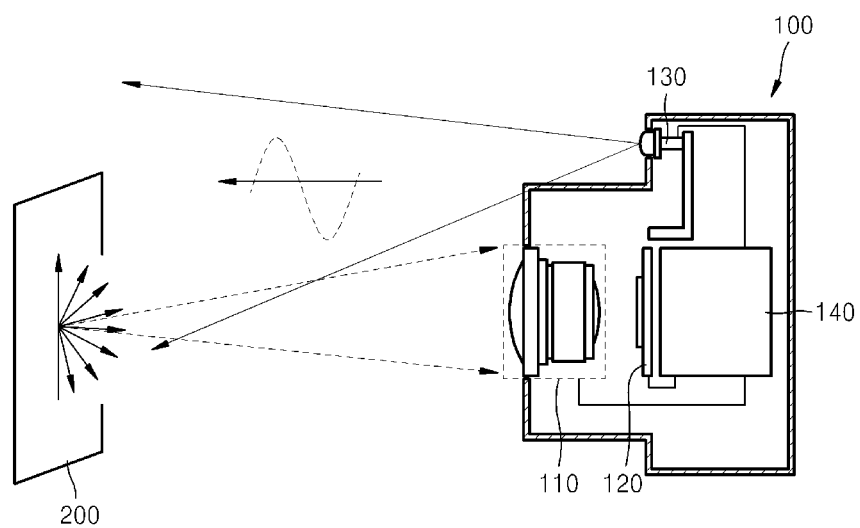
FIG. 1 is a conceptual view illustrating a structure of a 3D image acquisition apparatus, according to an exemplary embodiment.

Reference will now be made in detail to exemplary embodiments of an illumination system and a 3D image acquisition apparatus including the same, examples of which are illustrated in the accompanying drawings. In the drawings, like reference numerals in the drawings denote like elements, and the size of each component may be exaggerated for clarity.

FIG. 1 is a conceptual view illustrating a structure of a 3D image acquisition apparatus 100, according to an exemplary embodiment. Referring to FIG. 1, the 3D image acquisition apparatus 100 may include an objective lens 110 for focusing an image of an object 200, an image processing unit 120 for processing the image focused by the objective lens 110 to generate an image signal, an illumination optical system 130 for illuminating the object 200 to acquire depth information about the object 200, and a control unit 140 for controlling the operations of the objective lens 110, the image processing unit 120, and the illumination optical system 130. The illumination optical system 130 may irradiate illumination light, for example, infrared rays, onto the object 200. The infrared illumination light reflected off the object 200 is focused on the image processing unit 120 by the objective lens 110. Simultaneously, external visible light reflected off the object 200 may be focused on the image processing unit 120. The image processing unit 120 may generate a depth image signal for calculating the depth information about the object 200 by modulating the infrared illumination light using known TOF technology. The image processing unit 120 may also generate a general RGB image signal by using the visible light. The control unit 140 may calculate the depth information about the object 200 using the generated depth image signal and the RGB image signal to generate an image for a user.

Figure 2:
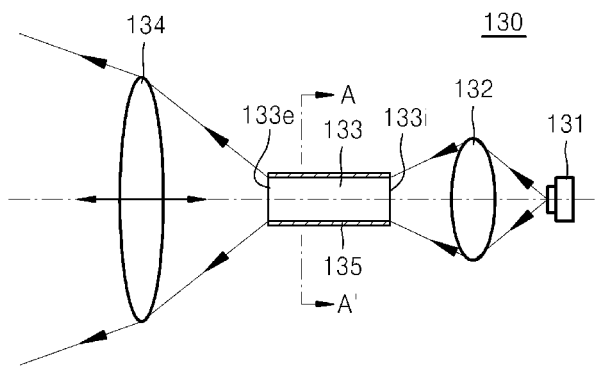
FIG. 2 is a schematic conceptual view illustrating a structure of an illumination optical system in FIG. 1, according to an exemplary embodiment.

As described above, since acquiring the depth information about the object 200 relies on the illumination light emitted from the illumination optical system 130, the illumination optical system 130 plays a crucial role in acquiring more precise depth information. FIG. 2 is a conceptual view illustrating a structure of the illumination optical system 130 allowing more precise depth information to be obtained, according to an exemplary embodiment. Referring to FIG. 2, the illumination optical system 130 may include a light source 131, a beam shaping element 133 for uniformly homogenizing light emitted from the light source 131 and changing a cross-sectional shape of the light beam into a predetermined shape, a matching lens 132 disposed between the light source 131 and the beam shaping element 133 and for guiding the light emitted from the light source 131 to a light-incidence surface 133i of the beam shaping element 133, and a lens apparatus 134 for focusing light emitted from a light-exit surface 133e of the beam shaping element 133 onto the object 200.

In some embodiments, the light source 131 may include an LED or an LD that emits light having an invisible near infrared wavelength of about 850 nm, for the safety of a user. However, this is only exemplary, and light having any appropriate wavelength and various kinds of light sources may be used. The light source 131 may emit light having a specifically defined waveform, for example, a sign wave, a lamp wave, or a square wave, according to a control signal received from the control unit 140.

Light emitted from the light source 131 is guided to the light-incidence surface 133i of the beam shaping element 133 via the matching lens 132. The beam shaping element 133 may be an integrator rod made of a transparent material, for example, glass or light-transmitting plastic. The light-incidence surface 133i and the light-exit surface 133e of the beam shaping element 133 may each have an anti-reflection coating thereon to reduce light loss due to reflection. A inner circumference surface of the beam shaping element 133 may have a high-reflection coating 135 thereon. The high-reflection coating 135 may be a metal mirror formed by depositing a high-reflectivity metal, such as gold (Au) or silver (Ag), on the inner circumference surface of the beam shaping element 133. In another embodiment, the high-reflection coating 135 may be a dielectric mirror having a multi-layer structure designed to have a reflectivity of about 99% or greater with respect to near infrared light emitted from the light source 131. Accordingly, the light incident on the light-incidence surface 133i undergoes total internal reflection while traveling in the beam shaping element 133, and is emitted from the beam shaping element 133 through the light-exit surface 133e.

Figure 3:
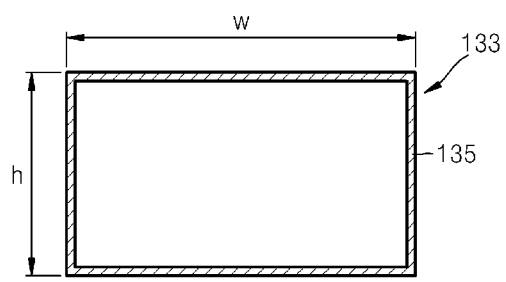
FIG. 3 is a schematic cross-sectional view of a beam shaping element of the illumination optical system of FIG. 2, taken along a line A-A.

Light emitted from the light-exit surface 133e may have a rectangular cross-section that is identical with that of the beam shaping element 133. The cross-sectional shape of the beam shaping element 133 may be substantially the same as that of a field of view of the 3D image acquisition apparatus 100. FIG. 3 is a schematic cross-sectional view of the beam shaping element 133 taken along a line A-A' in FIG. 2. Referring to FIG. 3, the beam shaping element 133 may have a rectangular cross-section. For example, if the field of view of the 3D image acquisition apparatus 100 has an aspect ratio of 4:3, as in many cameras, the beam shaping element 133 may have a width-to-height ratio (w:h) equal to the aspect ratio of the field of view, that is, 4:3. As a result, a field of illumination of the illumination optical system 130 may coincide with the field of view of the 3D image acquisition apparatus 100.

Figure 4:
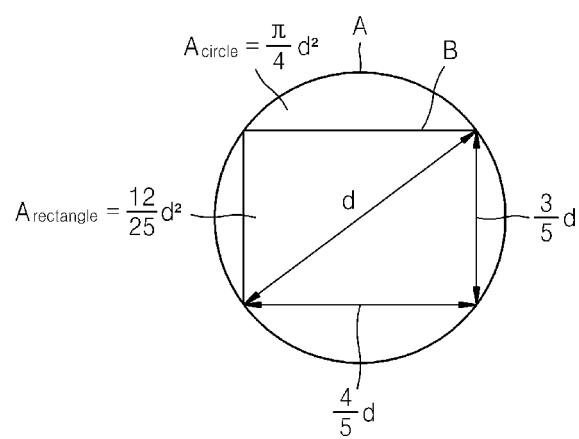
FIG. 4 is a view for describing that illumination efficiency increases according to a cross-sectional shape of illumination light emitted from the illumination optical system of FIG. 2.

FIG. 4 is a view for describing advantages achieved when the field of illumination of the illumination optical system 130 coincides with the field of view of the 3D image acquisition apparatus 100. In FIG. 4, a circle A denotes a field of illumination of a an illumination system having a circular cross-section, which does not coincide with the field of view of the 3D image acquisition apparatus 100 which is represented by the rectangle B. As described above, since the 3D image acquisition apparatus 100 has a rectangular field of view with an aspect ratio of 4:3, a considerable portion of illumination light is unused. That is, since the circle A, which encloses the rectangle B, does not match with the field of view of the 3D image acquisition apparatus 100, the portion of the illumination light that does not correspond to the field of view is not used for extracting depth information. Therefore, if the illumination light is condensed to fall within only the rectangle B (the field of view) so that the field of illumination coincides with the field of view, as in the present exemplary embodiment, light efficiency may be improved, enabling the acquisition of more precise depth information without increasing the power consumption of the light source 131.

For example, if the circle A has a diameter d, the area of the circle A is $(\pi/4) \cdot d^2$. The rectangle B, which is inscribed in the circle A with an aspect ratio of 4:3, may have an area of $(12/25) \cdot d^2$. Thus, if illumination light is condensed to fall within the rectangle B, the light efficiency may be increased by 1.64, which is obtained according to [(area of the circle A)/(area of the rectangle B)], which is equal to $25\pi/48$. According to one embodiment, since the beam shaping element 133 has the same cross-sectional shape as the field of view of the 3D image acquisition apparatus 100, the field of illumination of the illumination optical system 130 may coincide with the field of view of the 3D image acquisition apparatus 100. As a result, the light efficiency may be increased by about 60% or greater, and more precise depth information may be obtained.

While undergoing total internal reflection in the beam shaping element 133, light beams traveling along various paths are mixed together, homogenizing light intensity across the whole cross-section of the light beams. Consequently, the light intensity may be substantially the same at any spot within the field of illumination. Accordingly, speckle noise generated when using coherent light may be reduced or inhibited without light loss, further increasing the precision of the obtained depth information.

Referring back to FIG. 2, light emitted from the beam shaping element 133 is focused on the object 200 via the lens apparatus 134. As described above, the light focused on the object 200 may be condensed to fall within the field of view of the 3D image acquisition apparatus 100. To this end, both the cross-sectional shape of the beam shaping element 133, and the focusing by the lens apparatus 134 are important. That is, the lens apparatus 134 may be designed to have a magnification appropriate for projecting light within a region that coincides with the field of view of the 3D image acquisition apparatus 100. Although illustrated in FIG. 2 as one lens for convenience of illustration, the lens apparatus 134 may be, for example, a variable-magnification zoom lens including a plurality of lenses, or another arrangement including a plurality of lenses. If the objective lens 110 of the 3D image acquisition apparatus 100 is a zoom lens, zoom magnifications of the lens apparatus 134 and the objective lens 110 may be synchronously controlled. In one embodiment, the control unit 140 may simultaneously control the objective lens 110 of the 3D image acquisition apparatus 100 and the lens apparatus 134 of the illumination optical system 130 to have the same zoom magnification.

Figure 5:
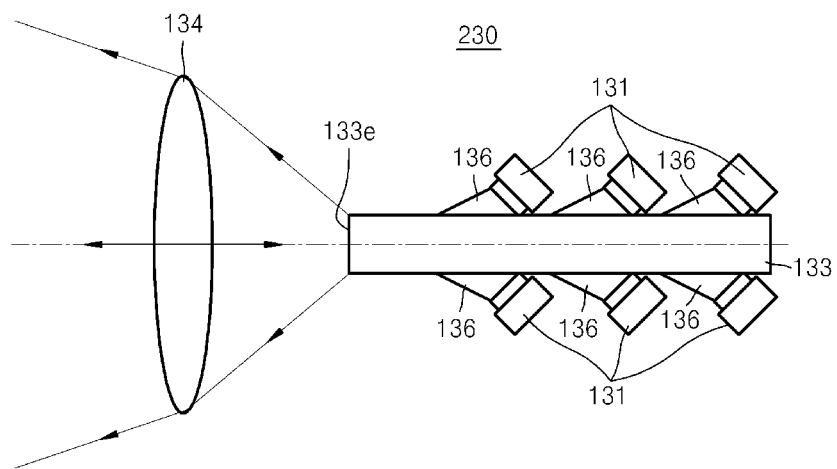
FIG. 5 is a schematic conceptual view illustrating a structure of an illumination optical system, according to another exemplary embodiment.

The greater the intensity of illumination light, the more precise the obtained depth information becomes. In this regard, the illumination optical system may include a plurality of light sources. FIG. 5 is a schematic conceptual view illustrating a structure of an illumination optical system 230 including a plurality of light sources 131, according to another exemplary embodiment. Referring to FIG. 5, the illumination optical system 230 may include a beam shaping element 133 for uniformly homogenizing light and changing a cross-selection shape of the light to a predetermined shape, the plurality of light sources 131 disposed along sides of the beam shaping element 133, a plurality of optical waveguides 136 for guiding light emitted from the plurality of light sources 131 into the beam shaping element 133, and a lens apparatus 134 for focusing light emitted from a light-exit surface 133*e* of the beam shaping element 133 on the object 200. To guide the light emitted from the light sources 131 into the beam shaping element 133, first ends of the optical waveguides 136 are attached to the light sources 131, respectively, and second ends thereof are attached to the sides of the beam shaping element 133. The optical waveguides 136 may be disposed to be inclined with respect to the sides of the beam shaping element 133 to enable the light guided into the beam shaping element 133 to travel toward the light-exit surface 133*e* of the beam shaping element 133.

Figure 6:
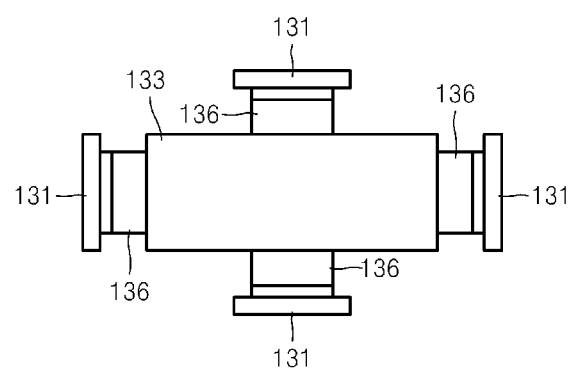
FIG. 6 is a schematic cross-sectional view illustrating that one light source and one optical waveguide of FIG. 5 are disposed on each of sides of a beam shaping element, according to another exemplary embodiment.

In FIG. 5, it is shown than the plurality of light sources 131 and the plurality of optical waveguides 136 are disposed on upper and lower sides of the beam shaping element 133. However, the light sources 131 and the optical waveguides 136 may be disposed additionally or alternatively on lateral sides of the beam shaping device 133. FIG. 6 is a schematic cross-sectional view illustrating an example in which the light sources 131 and the optical waveguides 136 are disposed on all sides of the beam shaping element 133, according to an exemplary embodiment. Referring to FIG. 6, the light sources 131 and the optical waveguides 136 may be disposed on four side surfaces of the beam shaping element 133 having a rectangular cross-section. Although, in the embodiment of FIG. 5 a plurality of the light sources 131 and a plurality of the optical waveguides 136 are disposed on each side of the beam shaping element 133, according to an alternative embodiment, only one light source 131 and one optical waveguide 136 may be disposed on each side of the beam shaping element 133.

Figure 7:
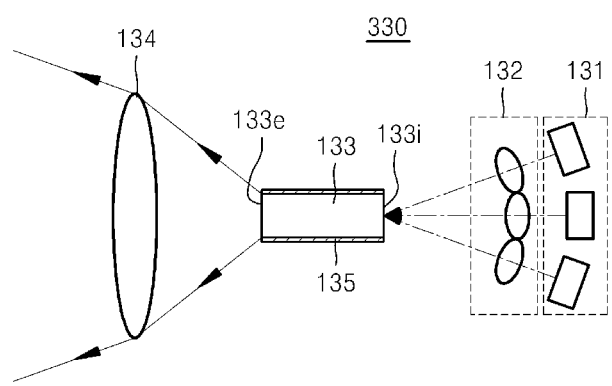
FIG. 7 is a schematic conceptual view illustrating a structure of an illumination optical system, according to another exemplary embodiment.

FIG. 7 is a schematic conceptual view illustrating a structure of an illumination optical system 330, according to another exemplary embodiment. Referring to FIG. 7, the illumination optical system 330 may include a plurality of light sources 131, a beam shaping element 133 for uniformly homogenizing light emitted from the plurality of light sources 131, a plurality of matching lenses 132 for guiding the light emitted from the plurality of light sources 131 to a light-incidence surface 133*i* of the beam shaping element 133, and a lens apparatus 134 for focusing light emitted from a light-exit surface 133*e* of the beam shaping element 133 onto the object 200. That is, in the embodiment of FIG. 7, an array of the plurality of light sources 131 and an array of the plurality of matching lenses 132 are disposed facing to the light-incidence surface 133*i* of the beam shaping element 133. As illustrated in FIG. 7, some of the light sources 131 and one or more of the matching lenses 132 which are disposed as offset from the centers of the arrays may have optical axes slightly tilted toward the light-incidence surface 133*i* of the beam shaping element 133. However, when a cross-sectional area of the beam shaping element 133 is sufficiently great or the light sources 131 and the matching lenses 132 are sufficiently small, all of the light sources 131 and the matching lenses 132 may be disposed having parallel optical axes.

Figure 8:
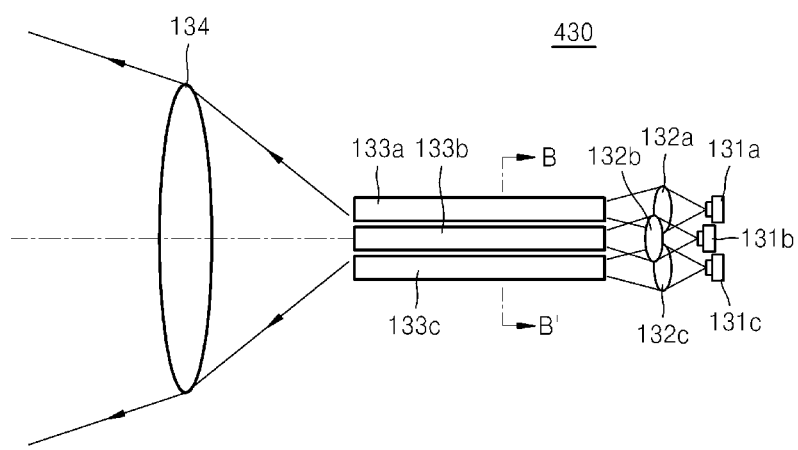
FIG. 8 is a schematic conceptual view illustrating a structure of an illumination optical system, according to another exemplary embodiment.

FIG. 8 is a schematic conceptual view illustrating a structure of an illumination optical system 430, according to another exemplary embodiment. In the present embodiment, the illumination optical system 430 may include a plurality of beam shaping elements 133*a*, 133*b*, and 133*c* to ensure that a plurality of light sources 131*a*, 131*b*, and 131*c* and a plurality of matching lenses 132*a*, 132*b*, and 132*c* may have parallel optical axes. In particular, referring to FIG. 8, the illumination optical system 430 may include an array of the plurality of light sources 131*a*, 131*b*, and 131*c*, an array of the plurality of matching lenses 132*a*, 132*b*, and 132*c*, and an array of the plurality of beam shaping elements 133*a*, 133*b*, and 133*c*, respectively corresponding to each other. For example, light emitted from the first light source 131*a* may be incident on the first beam shaping device 133*a* via the first matching lens 132*a*. Light emitted from the second light source 131*b* may be incident on the second beam shaping element 133*b* via the second matching lens 132*b*, and light emitted from the third light source 131*c* may be incident on the third beam shaping element 133*c* via the third matching lens 132*c*. Accordingly, optical axes of the plurality of light source 131*a*-131*c* may be parallel to those of the matching lenses 132*a*-132*c*.

Figure 9:
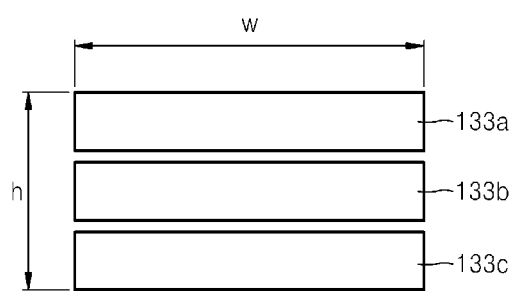
FIG. 9 is a schematic cross-sectional view illustrating an arrangement of a beam shaping element array illustrated in FIG. 8, according to an exemplary embodiment.
Figure 10:
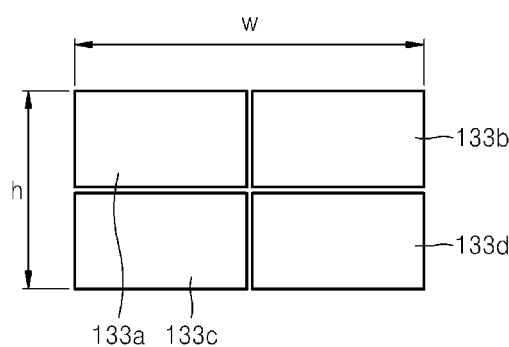
FIG. 10 is a schematic cross-sectional view illustrating an arrangement of a beam shaping element array, according to another exemplary embodiment.

When using the plurality of beam shaping elements 133*a*-133*c* of the present embodiment, a cross-sectional shape of the array of the beam shaping elements 133*a*-133*c* may be substantially the same as that of the field of view of the 3D image acquisition apparatus 100. FIG. 9 is a schematic cross-sectional view of the plurality of beam shaping elements 133*a*-133*c* taken along a line B-B' of FIG. 8, according to an exemplary embodiment. When the field of view of the 3D image acquisition apparatus 100 has an aspect ratio of 4:3, a width-to-height (w:h) ratio of the array of the beam shaping elements 133*a*-133*c*, as illustrated in FIG. 9, may be 4:3. The exemplary embodiment of FIG. 9 illustrates that the three beam shaping elements 133*a*-133*c* are sequentially stacked on one another in a height direction. In another embodiment, a plurality of beam shaping elements may be disposed both in a height direction and in a width direction, as illustrated in FIG. 10. FIG. 10 is a schematic cross-sectional view illustrating that four beam shaping elements 133*a*-133*d* are disposed in a width direction and in a height direction in a 2-by-2 array, according to another exemplary embodiment. In the present embodiment, four light sources 131 and four matching lenses 132 may be disposed to correspond to the beam shaping elements 133*a*-133*d*. In the embodiment of FIG. 10, a cross-sectional shape of the array of the beam shaping elements 133*a*-133*d* may be substantially the same as that of the field of view of the 3D image acquisition apparatus 100. For example, when the field of view of the 3D image acquisition apparatus 100 has an aspect ratio of 4:3, a width-to-height (w:h) ratio of the 2-by-2 array of the beam shaping elements 133*a*-133*d*, as illustrated in FIG. 10, may be 4:3.

Figure 11:
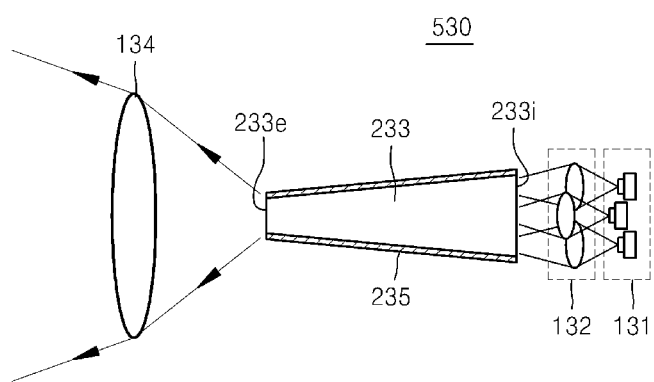
FIG. 11 is a schematic conceptual view illustrating a structure of an illumination optical system, according to another exemplary embodiment.

FIG. 11 is a schematic conceptual view illustrating a structure of an illumination optical system 530, according to another exemplary embodiment. As in the embodiment of FIG. 11, the illumination optical system 530 of FIG. 11 includes a plurality of light sources 131 and a plurality of matching lenses 132 that are disposed to have parallel optical axes. However, unlike the embodiment of FIG. 10, the illumination optical system 530 of FIG. 11 includes only one beam shaping element 233. In the present embodiment, a light-incidence surface 233*i* of the beam shaping element 233 is larger than a light-exit surface 233*e* of the beam shaping element 233, wherein the light-incidence surface 233*i* is sufficiently large to face all the plurality of light sources 131 and the matching lenses 132. For example, the beam shaping element 233 may have a shape that tapers from the light-incidence surface 233*i* to the light-exit surface 233*e*. This structure ensures that light emitted from the light-exit surface 233*e* of the beam shaping element 233 has a relatively small cross-section, thus allowing a relatively small aperture to be formed in the lens apparatus 134. Therefore, the lens apparatus 24 may be manufactured at a reduced cost.

So far to help understand exemplary embodiments of illumination optical systems, and 3D image acquisition apparatuses including the illumination optical systems, the embodiments are described with reference to the appended drawings. However, it should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been particularly shown and described, it will be understood by those of ordinary skill in the art that various changes in form and details may be made therein without departing from the spirit and scope of the inventive concept as defined by the following claims.

What is claimed is:

1. An illumination optical system of a 3-dimensional (3D) image acquisition apparatus having a field of view, the illumination optical system comprising:
   a light source;
   a beam shaping element which uniformly homogenizes light emitted from the light source and emits light having a predetermined cross-sectional shape; and
   a lens apparatus which focuses light emitted from the beam shaping element,
   wherein an aspect ratio of a cross-sectional shape of a light exit surface end of the beam shaping element is the same as an aspect ratio of the field of view of the 3D image acquisition apparatus, such that a field of illumination of the illumination optical system matches with the field of view of the 3D image acquisition apparatus.

2. The illumination optical system of claim 1, wherein the predetermined cross-sectional shape of the light emitted from the beam shaping element is the same as a cross-sectional shape of the light exit surface of the beam shaping element.

3. The illumination optical system of claim 1, further comprising a matching lens which is disposed between the light source and the beam shaping element and guides the light emitted from the light source to a light-incidence surface of the beam shaping element.

4. The illumination optical system of claim 3, further comprising an anti-reflection coating disposed on the light-incidence surface of the beam shaping element and an anti-reflection coating disposed on the light-exit surface of the beam shaping element.

5. The illumination optical system of claim 3, further comprising a reflection coating disposed on an inner circumference of the beam shaping element, wherein the light incident on the light-incidence surface of the beam shaping element travels through the beam shaping element toward the light light-exit surface of the beam shaping element while being reflected off the reflection coating disposed on the inner circumferential surface.

6. The illumination optical system of claim 1, wherein the beam shaping element comprises an integrator rod made of a transparent material.

7. The illumination optical system of claim 6, wherein the integrator rod has a rectangular cross-section.

8. The illumination optical system of claim 1, further comprising an optical waveguide which guides the light emitted from the light source into the beam shaping device, wherein a first end of the optical waveguide is attached to the light source, and a second end of the optical waveguide is attached to a side of the beam shaping element.

9. The illumination optical system of claim 8, wherein an optical axis of the optical waveguide is inclined with respect to the side of the beam shaping element.

10. The illumination optical system of claim 8, wherein the light source comprises a plurality of light sources, the optical waveguide comprises a plurality of optical waveguides, and each of the light sources is attached to the beam shaping element by one of the plurality of optical waveguides.

11. The illumination optical system of claim 10, wherein the beam shaping element has a rectangular cross-section, and at least one of the plurality of light sources and at least one of the plurality of optical waveguides are attached to each of four sides of the beam shaping element.

12. The illumination optical system of claim 1, further comprising a plurality of matching lenses, wherein the light source comprises a plurality of light sources, one of the plurality of matching lenses is disposed on an optical path between the beam shaping device and each of the plurality of light sources.

13. The illumination optical system of claim 12, wherein at least one of the plurality of light sources and at least one of the plurality of matching lenses have an optical axis which is tilted with respect to the light-incidence surface of the beam shaping element.

14. The illumination optical system of claim 12, wherein the beam shaping element has a tapered shape such that an area of the light-exit surface is smaller than an area of the light-incidence surface.

15. The illumination optical system of claim 1, further comprising a plurality of matching lenses, wherein the light source comprises a plurality of light sources, the beam shaping element comprises a plurality of beam shaping elements corresponding to the plurality of light sources, and one of the plurality of matching lenses is disposed on an optical path between one of the plurality of light sources and a corresponding one of the plurality of beam shaping elements.

16. The illumination optical system of claim 15, wherein the plurality of beam shaping elements are disposed in an array.

17. The illumination optical system of claim 16, wherein a width-to-height ratio of the array of beam shaping elements is proportional to the predetermined cross-sectional shape.

18. The illumination optical system of claim 1, wherein the lens apparatus comprises a zoom lens.

19. A 3-dimensional (3D) image acquisition apparatus comprising:
   an objective lens which focuses an image of an object;
   an image processing unit which processes the image focused by the objective lens and generates an image signal;
   the illumination optical system of claim 1 which illuminates the object; and
   a control unit which controls operations of the objective lens, the image processing unit, and the illumination optical system;
   wherein a cross-sectional shape of light emitted from a light exit surface end of the beam shaping element is proportional to a field of view of the 3D image acquisition apparatus.

20. The 3D image acquisition apparatus of claim 19, wherein the predetermined cross-sectional shape of the light emitted from the beam shaping element is the same as a cross-sectional shape of a light exit surface of the beam shaping element.

21. A 3-dimensional (3D) image acquisition apparatus comprising:
   an illumination optical system comprising:
      a light source,
      a beam shaping element which homogenizes light emitted from the light source and outputs light having a predetermined cross-sectional shape, and
      a lens apparatus which focuses light emitted from the beam shaping element;
   an image processing unit which processes an image and generates an image signal;
   wherein an aspect ratio of the predetermined cross-sectional shape is the same as an aspect ratio of a field of view of the image processing unit, such that a field of illumination of the illumination optical system matches with the field of view of the image processing unit.

* * * * *